United States Patent
Wen (10) Patent No.: US 9,621,309 B2
(45) Date of Patent: Apr. 11, 2017

(54) JOINT SCHEDULING METHOD AND APPARATUS

(71) Applicant: Huawei Technologies Co., Ltd., Shenzhen, Guangdong (CN)

(72) Inventor: Jini Wen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 54 days.

(21) Appl. No.: 14/199,491

(22) Filed: Mar. 6, 2014

(65) Prior Publication Data

US 2014/0192769 A1 Jul. 10, 2014

Related U.S. Application Data

(63) Continuation of application No. PCT/CN2012/081183, filed on Sep. 10, 2012.

(30) Foreign Application Priority Data

Sep. 9, 2011 (CN) .......................... 2011 1 0268186

(51) Int. Cl.
*H04W 4/00* (2009.01)
*H04L 5/00* (2006.01)
(Continued)

(52) U.S. Cl.
CPC ....... *H04L 5/0005* (2013.01); *H04W 72/1221* (2013.01); *H04W 74/04* (2013.01); *H04W 72/0453* (2013.01)

(58) Field of Classification Search
CPC ................................................ H04W 72/1221
See application file for complete search history.

(56) References Cited

U.S. PATENT DOCUMENTS

2006/0205422 A1* 9/2006 Hyslop ................. H04W 16/00
455/509
2010/0041407 A1* 2/2010 Caire et al. ................... 455/446
(Continued)

FOREIGN PATENT DOCUMENTS

CN 101784103 A 7/2010
CN 101895921 A 11/2010
(Continued)

*Primary Examiner* — Joseph Bednash
*Assistant Examiner* — Kevin Cunningham
(74) *Attorney, Agent, or Firm* — Leydig, Voit & Mayer, Ltd.

(57) ABSTRACT

Embodiments of the present invention provide a joint scheduling method and apparatus. The method of the present invention is as follows: judging whether a CoMP user equipment exists in user equipments that wait to be scheduled in a sector that participates in joint scheduling; scheduling, if a CoMP user equipment exists in user equipments that wait to be scheduled, the CoMP user equipment that waits to be scheduled and assigning CoMP frequency band resources to the scheduled CoMP user equipment according to a size of frequency band resources required by the scheduled CoMP user equipment, where the CoMP frequency band resources are partial frequency band resources allocated from frequency band resources of the sector that participates in joint scheduling and are preferentially used by the CoMP user equipment. Embodiments of the present invention mainly apply to a joint scheduling process in a wireless communications system.

16 Claims, 5 Drawing Sheets

(51) Int. Cl.
*H04W 72/12* (2009.01)
*H04W 74/04* (2009.01)
*H04W 72/04* (2009.01)

(56) References Cited

U.S. PATENT DOCUMENTS

2010/0322171 A1 12/2010 Dekorsy et al.
2012/0172076 A1* 7/2012 Seki .............................. 455/509

FOREIGN PATENT DOCUMENTS

| CN | 102076096 A | 5/2011 |
| CN | 102281647 A | 12/2011 |
| WO | WO 2011088018 A2 | 7/2011 |

* cited by examiner

JOINT SCHEDULING METHOD AND APPARATUS

CROSS-REFERENCE TO RELATED APPLICATIONS

This application is a continuation of International Patent Application No. PCT/CN2012/081183, filed on Sep. 10, 2012, which claims priority to Chinese Patent Application No. 201110268186.5, filed on Sep. 9, 2011, both of which are hereby incorporated by reference in their entireties.

FIELD OF THE INVENTION

The present invention relates to the field of wireless communications technologies, and in particular to a joint scheduling method and apparatus.

BACKGROUND OF THE INVENTION

With the development of mobile communications technologies, the Coordinated Multiple Points (CoMP) transmission technology that functions as a key technology in a mobile communications system, has become an important subject. In the CoMP technology, joint scheduling (JS) allows frequency band resources at each moment to be fully used, improves a system throughput, and reduces interference with edge users.

A joint scheduling algorithm is mainly designed to reduce interference between sectors and allow edge users and users that have the least interference with the edge users to occupy same time-and-frequency resources, so that time-and-frequency resources can be fully used and interference with edge users can be reduced. A conventional joint scheduling method is as follows: For the same time-and-frequency resources, proportionally fair (PF) priorities corresponding to various user combinations are calculated and a combination with a highest PF priority is selected for secluding. Specifically, it is assumed that three sectors exist in a base station and i, j, and k respectively represent one user in each sector. A transmission rate of i, a transmission rate of i under an influence of j, a transmission rate of i under an influence of j and k, a transmission rate of j, a transmission rate of j under an influence of i, a transmission rate of j under an influence of i and k, and the like need to be calculated. Transmission rates of users in various combinations are calculated and are divided by an average transmission rate of user i, j, or k to finally obtain the PF priority of each combination. Then, the combination with the highest PF priority is selected for scheduling.

In the process of implementing the preceding joint scheduling, the inventor found at least the following problems in the prior art: Though the system throughput is improved and the interference with edge users is reduced, the PF priorities of all possible user combinations need to be calculated. However, the number of user combinations is large and the calculation process is complicated, resulting in a relatively high calculation cost and a relatively large scheduling delay.

SUMMARY OF THE INVENTION

Embodiments of the present invention provide a joint scheduling method and apparatus, which resolve problems of a relatively high calculation cost and a relatively large scheduling delay while improving a system throughput and reducing the interference with edge users.

According to one aspect, a joint scheduling method is provided, including:

judging whether a Coordinated Multiple Points CoMP user equipment exists in user equipments that wait to be scheduled in a sector that participates in joint scheduling, where the CoMP user equipment is a user equipment that meets a CoMP transmission condition; and if a CoMP user equipment exists in the user equipments that wait to be scheduled, scheduling the CoMP user equipment that waits to be scheduled and assigning CoMP frequency band resources to the scheduled CoMP user equipment according to a size of frequency band resources required by the scheduled CoMP user equipment, where the CoMP frequency band resources are partial frequency band resources allocated from frequency band resources of the sector that participates in joint scheduling and are preferentially used by the CoMP user equipment.

According to one aspect, a joint scheduling apparatus is provided, including:

a CoMP judging unit, configured to judge whether a Coordinated Multiple Points CoMP user equipment exists in user equipments that wait to be scheduled in a sector that participates in joint scheduling, where the CoMP user equipment is a user equipment that meets a CoMP transmission condition; and a CoMP scheduling unit, configured to, if a CoMP user equipment exists in the user equipments that wait to be scheduled, schedule the CoMP user equipment that waits to be scheduled and assign CoMP frequency band resources to the scheduled CoMP user equipment according to a size of frequency band resources required by the scheduled CoMP user equipment, where the CoMP frequency band resources are partial frequency band resources allocated from frequency band resources of the sector that participates in joint scheduling and are preferentially used by the CoMP user equipment.

According to one aspect, a base station is provided, including a joint scheduling apparatus.

A joint scheduling method and apparatus provided in the embodiments of the present invention judge whether a user to be scheduled is a CoMP user that has relatively high interference with other users and allow the CoMP user to occupy dedicated CoMP frequency band resources so that the CoMP user does not share same frequency band resources with non-CoMP users. Therefore, interference with the non-CoMP users that is caused by the CoMP user is reduced to meet requirements of improving a system throughput and reducing interference with edge users. Compared with a method for calculating PF priorities corresponding to all possible user combinations in the prior art, a calculation process is simplified and problems of a relatively high cost and a relatively large scheduling delay are resolved.

DETAILED DESCRIPTION OF THE EMBODIMENTS

To make the objectives, technical solutions, and advantages of the present invention more comprehensible, the following further describes technical solutions of the present invention in detail with reference to embodiments and the accompanying drawings.

Figure 1:
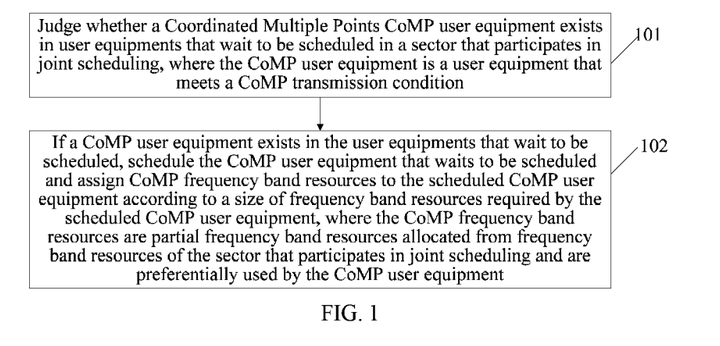
FIG. 1 is a flowchart of a joint scheduling method according to an embodiment of the present invention.

An embodiment of the present invention provides a joint scheduling method, as shown in FIG. 1, including:

101. Judge whether a Coordinated Multiple Points CoMP user equipment exists in user equipments that wait to be scheduled in a sector that participates in joint scheduling, where the CoMP user equipment is a user equipment that meets a CoMP transmission condition.

The CoMP user equipment is a user equipment that meets a CoMP transmission condition and the CoMP transmission condition may be preset by setting a calculation formula or a threshold. The CoMP transmission condition may be as follows: A difference between reference signal receiving power (RSRP) of a sector where a user equipment resides and RSRP of a sector outside the sector where the user equipment resides is smaller than or equal to a preset threshold. The RSRP may be obtained from existing user information on a base station server. If the difference between the reference signal receiving power RSRP of the sector where the user equipment resides and the RSRP of the sector outside the sector where the user equipment resides is smaller than or equal to the preset threshold, the user equipment is a CoMP user equipment; otherwise, the user equipment is a non-CoMP user equipment. The CoMP user equipment selected by using the above rules is mainly distributed in an edge area within a base station and has relatively high interference with other users. It should be understood that the preset threshold may be set according to an actual demand. It is not limited in this embodiment of the present invention.

In addition, according to an actual condition, a restriction range of the CoMP user can be adjusted by adjusting the preset threshold. Judging of a CoMP user includes but is not limited to the above method. A CoMP user may be judged by using other parameters, calculation formulas, or thresholds. It is not limited in this embodiment of the present invention.

102. If a CoMP user equipment exists in the user equipments that wait to be scheduled, schedule the CoMP user equipment that waits to be scheduled and assign CoMP frequency band resources to the scheduled CoMP user equipment according to a size of frequency band resources required by the scheduled CoMP user equipment, where the CoMP frequency band resources are partial frequency band resources allocated from frequency band resources of the sector that participates in joint scheduling and are preferentially used by the CoMP user equipment.

The CoMP frequency band resources may be CoMP frequency band resources allocated in advance from frequency band resources of a sector that participates in joint scheduling, CoMP frequency band resources allocated after a CoMP user equipment that waits to be scheduled exists, or further CoMP frequency band resources determined by other determination rules. A detailed method for determining CoMP frequency band resources is not limited in this embodiment of the present invention.

A joint scheduling method provided in this embodiment of the present invention judges whether a user to be scheduled is a CoMP user that has relatively high interference with other users and allows the CoMP user to occupy dedicated CoMP frequency band resources so that the CoMP user does not share same frequency band resources with non-CoMP users. Therefore, interference with the non-CoMP users that is caused by the CoMP user is reduced to meet requirements of improving a system throughput and reducing interference with edge users. Compared with a method for calculating PF priorities corresponding to all possible user combinations in the prior art, a calculation process is simplified and problems of a relatively high cost and a relatively large scheduling delay are resolved.

Further, a probability that CoMP users share a same frequency band is relatively high when dedicated frequency band resources are allocated for a CoMP user. If each user equipment in a same frequency band has relatively high interference, an interference suppression gain may be increased during joint receiving, thereby improving an anti-interference capability of the CoMP user and further reducing an implementation cost of an advanced receiver.

Figure 2:
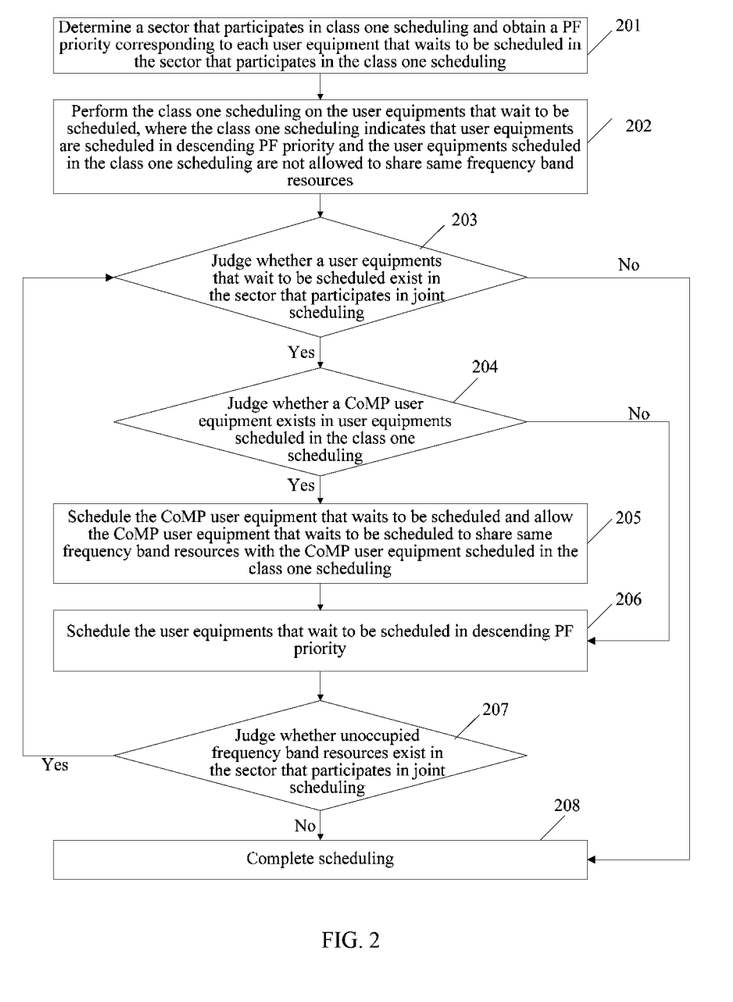
FIG. 2 is a flowchart of a joint scheduling method according to another embodiment of the present invention.

Another embodiment of the present invention provides a joint scheduling method to fully use frequency band resources of a sector that participates in joint scheduling, as shown in FIG. 2, including:

201. Determine a sector that participates in class one scheduling and obtain a PF priority corresponding to each user equipment that waits to be scheduled in the sector that participates in the class one scheduling.

In a mobile communications system, such as long term evolution (LTE) or long term evolution-advanced (LTE-A), the PF priority corresponding to each user equipment that waits to be scheduled may be obtained directly from existing user equipment information on a base station server instead of being recalculated.

In this embodiment, according to a preset sector selection rule, a sector that participates in the class one scheduling may be determined as, such as one or more selected specific sectors or all sectors that participate in joint scheduling. Specifically, the preset sector selection rule may be as follows: Three sectors, where the number of user equipments that wait to be scheduled is relatively large, are selected from sectors that participate in joint scheduling in descending number of user equipments. In addition, the joint scheduling method may apply to joint scheduling within a base station or joint scheduling among base stations. Specifically, during joint scheduling within the base station, the preset sector selection rule may be that one or more specific sectors from sectors within the base station may be set to participate the class one scheduling. During joint scheduling among base stations, the preset sector selection rule may be that one or more specific sectors from the sectors that participate in joint scheduling are selected to participate the class one scheduling, where the sectors that participate in joint scheduling may belong to different base stations.

202. Perform the class one scheduling on the user equipments that wait to be scheduled, where the class one scheduling indicates that user equipments are scheduled in descending PF priority and the user equipments scheduled in the class one scheduling are not allowed to share same frequency band resources.

Optionally, obtaining of the PF priorities in step 201 and the class one scheduling in step 202 may be as follows: According to features of a base station and a sector, one or more specific sectors are selected from all sectors to perform the obtaining of the PF priorities of user equipments and the class one scheduling. The obtaining of the PF priorities of user equipments in step 201 and the class one scheduling in step 202 may further be as follows: The PF priorities corresponding to user equipments in all sectors that wait to be scheduled are obtained and then the class one scheduling is performed.

Specifically, joint scheduling within a base station is used as an example. The method of the class one scheduling may be as follows: All user equipments that wait to be scheduled are sorted in order of PF priority and then user equipments are scheduled successively in descending PF priority until a scheduled user equipment exists in each frequency band of the base station. After the class one scheduling is performed on user equipments that wait to be scheduled in all sectors that participate in joint scheduling, the scheduled user equipments may be separately distributed in each sector within the base station. Therefore, within each sector, partial frequency band resources are occupied and still partial frequency band resources are not occupied.

Still, joint scheduling within a base station is used as an example. The method of the class one scheduling may further be as follows: Select a specific sector within the base station to perform the class one scheduling; and obtain the PF priorities corresponding to user equipments that wait to be scheduled in the specific sector within the base station and schedule the user equipments in the sector successively in descending PF priority until a scheduled user equipment exists in each frequency band of the sector. After the class one scheduling, the scheduled user equipments are all distributed in the sector, the frequency band resources of the sector are completely occupied, and frequency band resources of other sectors are not occupied.

In addition, during joint scheduling among base stations, each sector in different base stations is added to a joint scheduling algorithm. Likewise, the method of the class one scheduling may further be as follows: Select specific sectors to perform the class one scheduling from sectors that participate in joint scheduling, and schedule, according to the PF priorities of all user equipments that wait to be scheduled in the selected specific sector, the user equipments successively in descending PF priority until a scheduled user equipment exists in each frequency band of the selected specific sectors.

In this embodiment, the class one scheduling is performed on the user equipments that wait to be scheduled in descending PF priority and each user equipment scheduled in the class one scheduling does not occupy same frequency band resources so that all frequency band resources are occupied as much as possible. This fully uses the frequency band resources of a base station and improves an average throughput of a mobile communications system.

203. Judge whether a user equipment that waits to be scheduled exists in a sector that participates in joint scheduling; perform step 204 if a user equipment that waits to be scheduled exists in a sector that participates in joint scheduling; and perform step 208 if no user equipment that waits to be scheduled exists in a sector that participates in joint scheduling.

After the class one scheduling in step 202, if it is determined that no user equipment that waits to be scheduled exists in the sector that participates in joint scheduling, it indicates that the frequency band resources is sufficient for the scheduled user equipments to operate in different frequency bands separately. That is, only one user equipment exists in each frequency band and relatively low interference exists in user equipments. Therefore, cooperation among user equipments in same frequency band resources is unnecessary and scheduling is complete. After the class one scheduling, if it is determined that a user equipment that waits to be scheduled exists in the sector that participates in joint scheduling, further scheduling may be performed. The user equipment that is not scheduled is assigned to corresponding frequency band resources to share same frequency band resources with the scheduled user equipment in corresponding frequency band resources.

204. Judge whether a CoMP user equipment exists in the user equipments scheduled in the class one scheduling; perform step 205 if a CoMP user equipment exists in the user equipments scheduled in the class one scheduling; and perform step 206 if no CoMP user equipment exists in the user equipments scheduled in the class one scheduling.

205. Schedule the CoMP user equipment that waits to be scheduled and allow the CoMP user equipment that waits to be scheduled to share same frequency band resources with the CoMP user equipment scheduled in the class one scheduling.

If a CoMP user equipment exists in the user equipments scheduled in the class one scheduling, CoMP frequency band resources are determined according to the scheduled CoMP user equipment so that a CoMP user equipment is selected for scheduling and shares a same frequency band with the scheduled CoMP user equipment, that is, occupies frequency band resources of each sector that are not occupied after the class one scheduling in step 202. When multiple CoMP user equipments exist in user equipments that wait to be scheduled, the CoMP user equipments that wait to be scheduled are scheduled successively in descending PF priority of the CoMP user equipments that wait to be scheduled.

206. Schedule the user equipments that wait to be scheduled in descending PF priority.

The CoMP transmission condition may be adjusted according to an actual condition to judge whether a user equipment is a CoMP user equipment. Further, the CoMP transmission condition may be less restrictive. The proportion of the CoMP user equipments in user equipments that wait to be scheduled in the class one scheduling is increased and the CoMP transmission condition is adjusted so that at least one CoMP user equipment exists in the class one scheduling and a condition that no CoMP user equipment exists in the class one scheduling is avoided. Therefore, a probability that no CoMP user equipment exists in user equipments scheduled in the class one scheduling is low. If the condition that no CoMP user equipment exists in user equipments scheduled in the class one scheduling exists, it indicates that only a few CoMP user equipments exist and interference caused by the CoMP user equipments is relatively low. The user equipments that wait to be scheduled may be scheduled in descending PF priority.

In addition, if no CoMP user equipments exist in user equipments scheduled in the class one scheduling, a CoMP user equipment that waits to be scheduled may be selected for scheduling and allowed to occupy the CoMP frequency band resources that are allocated in advance.

207. Judge whether unoccupied frequency band resources exist in a sector that participates in joint scheduling; perform step 203 if unoccupied frequency band resources exist in the sector; and perform step 208 if all frequency band resources of the sector are occupied.

If unoccupied frequency band resources exist in the sector, use the method in steps 203 to 206 to continue to select corresponding user equipments to share same frequency band resources with scheduled user equipments in these frequency bands. If all frequency band resources of the sector are occupied, that is, all frequency band resources of a sector that participates in joint scheduling are occupied, and in each frequency band, corresponding user equipments are selected for combining to share same frequency band resources, scheduling is complete.

208. Complete scheduling.

Scheduling is complete when no user equipment that waits to be scheduled or no unoccupied frequency band resource exists.

Optionally, the CoMP frequency band resources may be frequency band resources occupied by scheduled CoMP user equipments or CoMP frequency band resources that are allocated in advance. Before the judging whether a Coordinated Multiple Points CoMP user equipment exists in user equipments that wait to be scheduled, the CoMP frequency band resources are allocated in advance from all frequency band resources for the CoMP user equipments that wait to be scheduled to occupy the CoMP frequency band resources. By using a method of allocating the CoMP frequency band resources in advance, partial or all steps from step 201 to step 204 may be skipped, the CoMP user equipments are directly selected to occupy the CoMP frequency band resources allocated in advance, and the remaining user equipments may be scheduled according to the PF priority to occupy non-CoMP frequency band resources.

It should be noted that application of embodiments of the present invention is not limited to joint scheduling within a base station. During joint scheduling among base stations, each sector in different base stations may be added to the joint scheduling algorithm of the embodiment of the present invention. The scheduling method after the number of the sectors is increased is essentially the same as the joint scheduling method within a base station.

A joint scheduling method provided in this embodiment of the present invention judges whether a user to be scheduled is a CoMP user that has relatively high interference with other users and allows the CoMP user to occupy dedicated CoMP frequency band resources so that the CoMP user does not share same frequency band resources with non-CoMP users. Therefore, interference with the non-CoMP users that is caused by the CoMP user is reduced to meet requirements of improving a system throughput and reducing interference with edge users. Compared with a method for calculating PF priorities corresponding to all possible user combinations in the prior art, a calculation process is simplified and problems of a relatively high cost and a relatively large scheduling delay are resolved.

Further, a probability that CoMP users share a same frequency band is relatively high when dedicated frequency band resources are allocated for a CoMP user. If each user equipment in a same frequency band has relatively high interference, an interference suppression gain may be increased during joint receiving, thereby improving an anti-interference capability of the CoMP user and further reducing an implementation cost of an advanced receiver.

Figure 3:
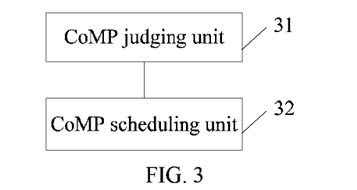
FIG. 3 is a block diagram of a joint scheduling apparatus according to an embodiment of the present invention.

An embodiment of the present invention provides a joint scheduling apparatus that may apply to a mobile communications base station, as shown in FIG. 3, including: a CoMP judging unit 31 and a CoMP scheduling unit 32.

The CoMP judging unit 31 is configured to judge whether a Coordinated Multiple Points CoMP user equipment exists in user equipments that wait to be scheduled in a sector that participates in joint scheduling, where the CoMP user equipment is a user equipment that meets a CoMP transmission condition.

The CoMP scheduling unit 32 is configured to, if a CoMP user equipment exists in the user equipments that wait to be scheduled, schedule the CoMP user equipment that waits to be scheduled and assign CoMP frequency band resources to the scheduled CoMP user equipment according to a size of frequency band resources required by the scheduled CoMP user equipment, where the CoMP frequency band resources are partial frequency band resources allocated from frequency band resources of the sector that participates in joint scheduling and are preferentially used by the CoMP user equipment.

Figure 4:
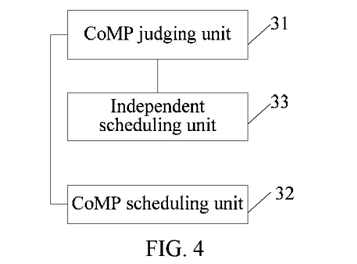
FIG. 4 is a block diagram of another joint scheduling apparatus according to an embodiment of the present invention.

Further, as shown in FIG. 4, the joint scheduling apparatus further includes: an independent scheduling unit 33.

The independent scheduling unit 33 is configured to, when all user equipments that wait to be scheduled are non-CoMP user equipments, obtain a Proportionally Fair PF priority corresponding to each user equipment that waits to be scheduled in the sector that participates in joint scheduling and schedule the user equipments that wait to be scheduled in descending PF priority.

Figure 5:
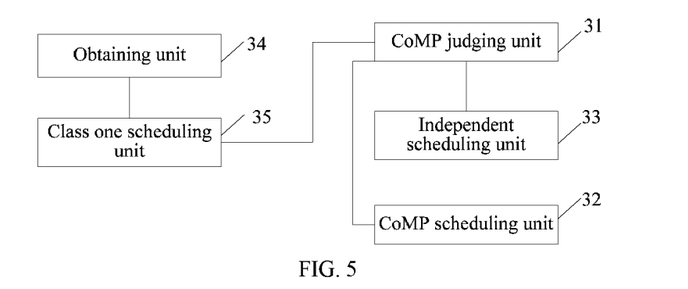
FIG. 5 is a block diagram of another joint scheduling apparatus according to an embodiment of the present invention.

Further, as shown in FIG. 5, the joint scheduling apparatus further includes: an obtaining unit 34 and a class one scheduling unit 35.

The obtaining unit 34 is configured to, before the CoMP judging unit 31 judges whether a Coordinated Multiple Points CoMP user equipment exists in user equipments that wait to be scheduled, determine a sector that participates in class one scheduling and obtain the PF priority corresponding to each user equipment that waits to be scheduled in the sector that participates in the class one scheduling.

The class one scheduling unit 35 is configured to perform the class one scheduling on the user equipments that wait to be scheduled, where the class one scheduling indicates that user equipments are scheduled in descending PF priority and the user equipments scheduled in the class one scheduling are not allowed to share same frequency band resources.

Figure 6:
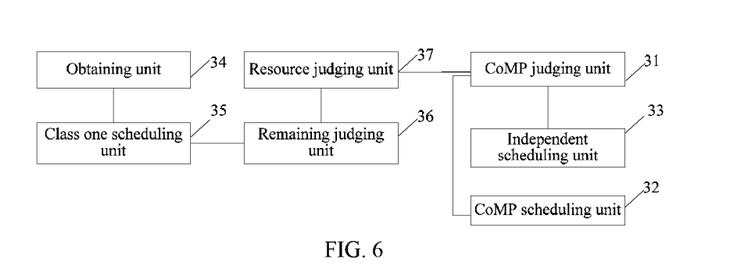
FIG. 6 is a block diagram of another joint scheduling apparatus according to an embodiment of the present invention.

Further, as shown in FIG. 6, the joint scheduling apparatus further includes: a remaining judging unit 36 and a resource judging unit 37.

The remaining judging unit 36 is configured to, before the CoMP judging unit 31 judges whether a Coordinated Multiple Points CoMP user equipment exists in user equipments that wait to be scheduled in the sector that participates in joint scheduling, judge whether a user equipment that waits to be scheduled exists in the sector that participates in joint scheduling.

The CoMP judging unit 31 is further configured to, after the remaining judging unit 36 determines that a user equipment that waits to be scheduled exists, execute the judging whether a Coordinated Multiple Points CoMP user equipment exists in user equipments that wait to be scheduled.

The resource judging unit 37 is configured to, before the remaining judging unit 36 judges whether a user equipment that waits to be scheduled exists in the sector that participates in joint scheduling, judge whether unoccupied frequency band resources exist in each sector.

The remaining judging unit 36 is further configured to, after the resource judging unit 37 determines that unoccupied frequency band resources exist in the sector, continue to execute the judging whether a user equipment that waits to be scheduled exists.

Figure 7:
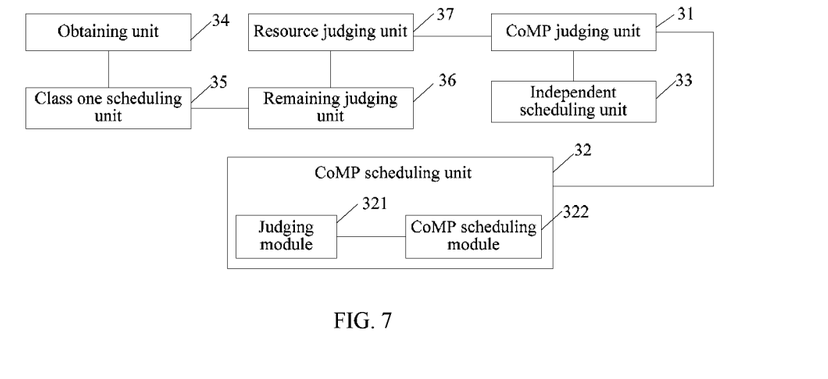
FIG. 7 is a block diagram of another joint scheduling apparatus according to an embodiment of the present invention.

Further, as shown in FIG. 7, the CoMP scheduling unit 32 includes: a judging module 321 and a CoMP scheduling module 322.

The judging module 321 is configured to judge whether a CoMP user equipment exists in user equipments scheduled in the class one scheduling.

The CoMP scheduling module 322 is configured to, after the judging module 321 determines that a CoMP user equipment exists in user equipments scheduled in the class one scheduling, schedule the CoMP use equipment that waits to be scheduled and allow the CoMP user equipment that waits to be scheduled and CoMP user equipment scheduled in the class one scheduling to share same frequency band resources, where the CoMP frequency band resources are frequency band resources that occupied by the CoMP user equipment scheduled in the class one scheduling.

The CoMP scheduling module 322 is further configured to, after the judging module 321 determines that no CoMP user equipment exists in user equipments scheduled in the class one scheduling, schedule the CoMP user equipment that waits to be scheduled, and assign, according to a size of frequency band resources required by the scheduled CoMP user equipment, the CoMP frequency band resources allocated in advance to the scheduled CoMP user equipment.

Figure 8:
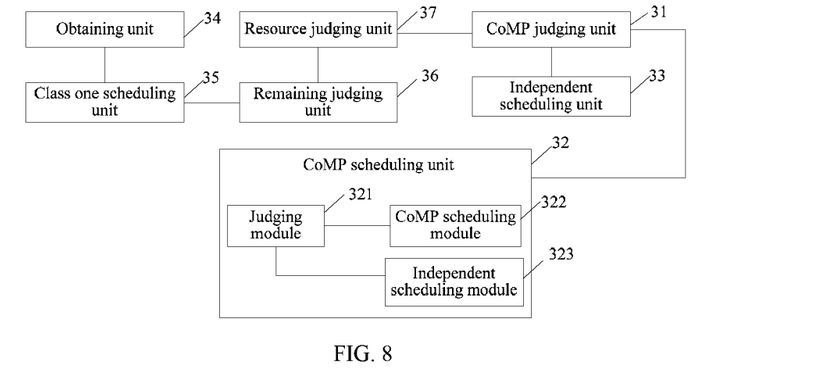
FIG. 8 is a block diagram of another joint scheduling apparatus according to an embodiment of the present invention.

Further, as shown in FIG. 8, the CoMP scheduling unit 32 further includes: an independent scheduling module 323.

The independent scheduling module 323 is configured to, after the judging module 321 determines that no CoMP user equipment exists in user equipments scheduled in the class one scheduling, schedule user equipments that wait to be scheduled in descending PF priority.

Figure 9:
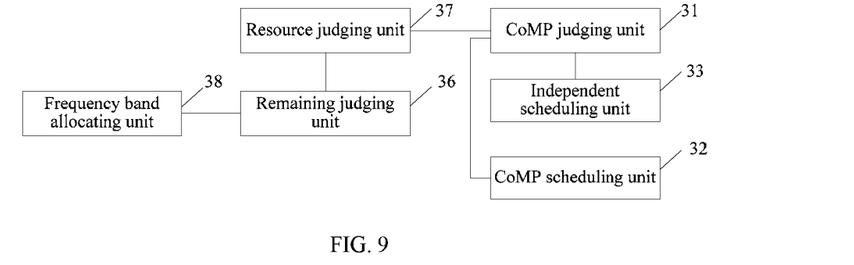
FIG. 9 is a block diagram of another joint scheduling apparatus according to an embodiment of the present invention.

Further, as shown in FIG. 9, the joint scheduling apparatus further includes: a frequency band allocating unit 38.

The frequency band allocating unit 38 is configured to, before the CoMP judging unit 31 judges whether a Coordinated Multiple Points CoMP user equipment exists in user equipments that wait to be scheduled or before the remaining judging unit 36 judges whether a user equipment that waits to be scheduled exists in the sector that participates in joint scheduling, allocate CoMP frequency band resources from all frequency band resources in advance for the CoMP user equipments that wait to be scheduled to occupy the CoMP frequency band resources.

Figure 10:
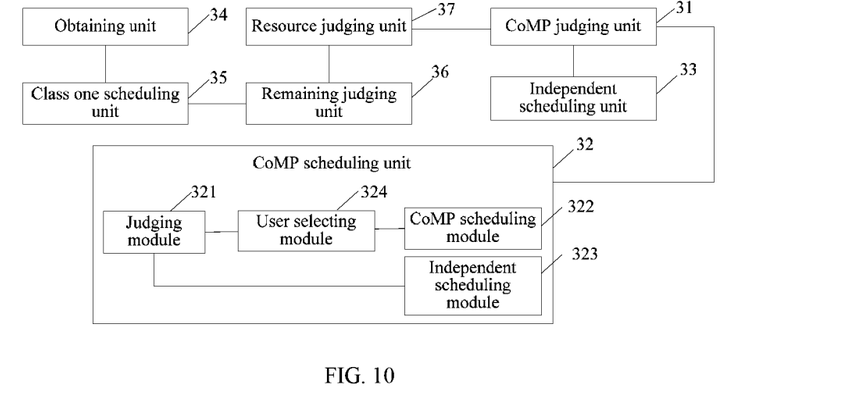
FIG. 10 is a block diagram of another joint scheduling apparatus according to an embodiment of the present invention.

Further, as shown in FIG. 10, the CoMP scheduling unit 32 further includes: a user selecting module 324.

The user selecting module 324 is configured to determine whether a user equipment that waits to be scheduled is a CoMP user equipment, that is, judge whether a difference between reference signal receiving power (RSRP) of a sector where the user equipment resides and RSRP of a sector outside the sector where the user equipment resides is smaller than or equal to a preset threshold.

If the difference between the RSRP of the sector where the user equipment resides and the RSRP of the sector outside the sector where the user equipment resides is smaller than or equal to the preset threshold, it is determined that the user equipment is a CoMP user equipment; otherwise, it is determined that the user equipment is a non-CoMP user equipment.

It should be noted that for the description of partial functional modules in the joint scheduling apparatus provided in this embodiment of the present invention, reference may be made to content corresponding to the joint scheduling method part in SUMMARY of the present invention, which is not described here.

It should be understood that, for joint scheduling within a base station, the joint scheduling apparatus of this embodiment of the present invention may be set in a base station and for joint scheduling among base stations, it may be an independent apparatus to implement joint scheduling among base stations in this embodiment of the present invention.

Further, an embodiment of the present invention further provides a base station including a joint scheduling apparatus as shown in any one of FIG. 3 to FIG. 10.

Further, the base station may further include other apparatuses, such as a receiving/sending apparatus and a signal processing apparatus.

A joint scheduling method and apparatus provided in the embodiments of the present invention judge whether a user to be scheduled is a CoMP user that has relatively high interference with other users and allow the CoMP user to occupy dedicated CoMP frequency band resources so that the CoMP user does not share same frequency band resources with non-CoMP users. Therefore, interference with the non-CoMP users that is caused by the CoMP user is reduced to meet requirements of improving a system throughput and reducing interference with edge users. Compared with a method for calculating PF priorities corresponding to all possible user combinations in the prior art, a calculation process is simplified and problems of a relatively high cost and a relatively large scheduling delay are resolved.

Further, a probability that CoMP users share a same frequency band is relatively high when dedicated frequency band resources are allocated for a CoMP user. If each user equipment in a same frequency band has relatively high interference, an interference suppression gain may be increased during joint receiving, thereby improving an anti-interference capability of the CoMP user and further reducing an implementation cost of an advanced receiver.

Through the foregoing description of the embodiments, it is clear to persons skilled in the art that the present invention may be implemented by software plus necessary universal hardware, and definitely may also be implemented by hardware, but in many cases, the software implementation is preferred. Based on such an understanding, the technical solutions of the present invention essentially, or the part contributing to the prior art may be implemented in the form of a software product. The computer software product is stored in a readable storage medium, for example, a floppy disk, hard disk, or optical disk of the computer, and includes several instructions for instructing a computer device (which may be a personal computer, a server, a network device, and the like) to perform the methods described in the embodiments of the present invention.

The foregoing descriptions are merely specific embodiments of the present invention, but are not intended to limit the protection scope of the present invention. Any variation or replacement readily figured out by persons skilled in the art within the technical scope disclosed in the present invention shall all fall within the protection scope of the present invention. Therefore, the protection scope of the present invention shall be subject to the protection scope of the claims.

What is claimed is:

1. A joint scheduling method, comprising:
   determining, by a joint scheduling apparatus, a Proportionally Fair (PF) priority for each user equipment waiting to be scheduled in a sector of a base station, wherein the sector participates in class one scheduling;
   performing, by the joint scheduling apparatus, the class one scheduling on each user equipment, wherein the class one scheduling includes: (1) scheduling each user equipment in a descending PF priority; (2) based on the descending PF priority, assigning each frequency band resource of the sector to each user equipment until each of all frequency band resources is assigned to one user equipment or until each user equipment is assigned with one of the frequency band resources;
   when each of all frequency band resources is assigned with one user equipment, and there are still remaining user equipments waiting to be scheduled in the sector, performing, by the joint scheduling apparatus, joint scheduling on each of the remaining user equipments; wherein the joint scheduling includes: (a) judging whether there are Coordinated Multiple Points (CoMP) user equipments among all user equipments; (b) when there are the CoMP user equipments, assigning each of remaining user equipments judged to be CoMP user equipments to each frequency band resource that has been assigned to each of class one scheduled user equipments judged to be CoMP user equipments, so that the user equipments judged to be CoMP share the same frequency band resources;
   wherein a CoMP user equipment is a user equipment that meets a CoMP transmission condition.

2. The joint scheduling method according to claim 1, further comprising:
   if all the user equipments that wait to be scheduled are non-CoMP user equipments, scheduling the remaining user equipments in the descending PF priority.

3. The joint scheduling method according to claim 1, wherein the CoMP user equipments are not allowed to share same frequency band resources with non-CoMP user equipments.

4. The joint scheduling method according to claim 1, if no CoMP user equipment exists in the class one scheduled user equipments, scheduling the remaining user equipments in the descending PF priority.

5. The joint scheduling method according to claim 1, when there are unoccupied frequency band resources existing in the sector,
   continuing to determine whether there are any remaining user equipments that are waiting to be scheduled in the sector.

6. The joint scheduling method according to claim 5, wherein before judging whether the CoMP user equipment exists in the remaining user equipments, the method further comprises:
   allocating the frequency band resources that have been assigned to the class one scheduled user equipments judged to be CoMP user equipments from all frequency band resources in advance for the remaining user equipments judged to be CoMP user equipments to occupy the frequency band resources that have been assigned to the class one scheduled user equipments judged to be CoMP user equipments.

7. The joint scheduling method according to claim 1, wherein the CoMP transmission condition comprises: a difference between reference signal receiving power (RSRP) of a sector where a user equipment resides and RSRP of a sector outside the sector where the user equipment resides is smaller than or equal to a preset threshold, and
   if the difference is smaller than or equal to the preset threshold, the user equipment is the CoMP user equipment.

8. A joint scheduling apparatus, comprising:
   a memory; and
   a processor coupled with the memory;
   where the memory contains computer-executable instructions, which when executed by the processor, cause the processor to implement operations including:
   determining, a Proportionally Fair (PF) priority for each user equipment waiting to be scheduled in a sector of a base station, wherein the sector participates in class one scheduling;
   performing, by the joint scheduling apparatus, the class one scheduling on each user equipment, wherein the class one scheduling includes: (1) scheduling each user equipment in a descending PF priority; (2) based on the descending PF priority, assigning each frequency band resource of the sector to each user equipment until each of all frequency band resources is assigned to one user equipment or until each user equipment is assigned with one of the frequency band resources;
   when each of all frequency band resources is assigned with one user equipment, and there are still remaining user equipments waiting to be scheduled in the sector, performing, by the joint scheduling apparatus, joint scheduling on each of the remaining user equipments; wherein the joint scheduling includes: (a) judging whether there are Coordinated Multiple Points (CoMP) user equipments among all user equipments; (b) when there are the CoMP user equipments, assigning each of remaining user equipments judged to be CoMP user equipments to each frequency band resource that has been assigned to each of class one scheduled user equipments judged to be CoMP user equipments, so that the user equipments judged to be CoMO share the same frequency band resources;
   wherein a CoMP user equipment is a user equipment that meets a CoMP transmission condition.

9. The joint scheduling apparatus according to claim 8, wherein the operations further comprise:
   when all the user equipments that wait to be scheduled are non-CoMP user equipments, scheduling the remaining user equipments the descending PF priority.

10. The joint scheduling apparatus according to claim 8, the CoMP user equipments are not allowed to share same frequency band resources with non-CoMP user equipments.

11. The joint scheduling apparatus according to claim 8, wherein the operations further comprise:
    if no CoMP user equipment exists in the class one scheduled user equipments, scheduling the remaining user equipments in the descending PF priority.

12. The joint scheduling apparatus according to claim 8, wherein the operation further comprises:
    when there are unoccupied frequency band resources existing in the sector,
    continuing to determine whether there are any remaining user equipments that are waiting to be scheduled in the sector.

13. The joint scheduling apparatus according to claim 12, wherein the operation further comprises:

before judging whether the CoMP user equipment exists in the remaining user equipments, allocating the frequency band resources assigned to the class one scheduled user equipments judged to be CoMP user equipments from all frequency band resources, in advance for the remaining user equipments judged to be CoMP user equipments to occupy the frequency band resources that have been assigned to the class one scheduled user equipments judged to be CoMP user equipments.

14. The joint scheduling apparatus according to claim 8, wherein the CoMP transmission condition comprises: a difference between reference signal receiving power (RSRP) of a sector where a user equipment resides and RSRP of a sector outside the sector where the user equipment resides is smaller than or equal to a preset threshold, and if the difference is smaller than or equal to the preset threshold, the user equipment is the CoMP user equipment.

15. The joint scheduling method according to claim 1, wherein after it is determined that no CoMP user equipment exists in the user equipments scheduled in the class one scheduling, the method further comprises: scheduling, the remaining user equipments, and assigning the frequency band resources that have been assigned to the class one scheduled user equipments judged to be CoMP user equipments and allocated in advance to the remaining user equipments judged to be CoMP user equipments, according to a size of frequency band resources required by the remaining user equipments judged to be CoMP user equipments.

16. The joint scheduling apparatus according to claim 8, wherein the operations further comprises:

after it is determined that no CoMP user equipment exists in the user equipments scheduled in class one scheduling, scheduling the remaining user equipment judged to be CoMP user equipments and assign the frequency band resources that have been assigned to the class one scheduled user equipments judged to be CoMP user equipments and allocated in advance to the remaining user equipments judged to be CoMP user equipments, according to a size of frequency band resources required by the remaining user equipments judged to be CoMP user equipments.

* * * * *